United States Patent
Chen et al.

(10) Patent No.: US 11,649,306 B2
(45) Date of Patent: *May 16, 2023

(54) MODIFIED ZIEGLER-NATTA (PRO) CATALYSTS AND SYSTEM

(71) Applicant: Dow Global Technologies LLC, Midland, MI (US)

(72) Inventors: Linfeng Chen, Missouri City, TX (US); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/371,728

(22) Filed: Jul. 9, 2021

(65) Prior Publication Data

US 2021/0332170 A1  Oct. 28, 2021

Related U.S. Application Data

(63) Continuation of application No. 16/331,644, filed as application No. PCT/US2017/052601 on Sep. 21, 2017, now Pat. No. 11,091,572.

(60) Provisional application No. 62/401,328, filed on Sep. 29, 2016.

(51) Int. Cl.
*C08F 210/16* (2006.01)
*C08F 10/00* (2006.01)

(52) U.S. Cl.
CPC .......... *C08F 210/16* (2013.01); *C08F 10/00* (2013.01); *C08F 2410/04* (2013.01)

(58) Field of Classification Search
CPC .................................................. C08F 210/16
See application file for complete search history.

(56) References Cited

U.S. PATENT DOCUMENTS

| | | |
|---|---|---|
| 3,113,115 A | 12/1963 | Ziegler et al. |
| 3,257,332 A | 6/1966 | Ziegler et al. |
| 4,250,288 A | 2/1981 | Lowery, Jr. et al. |
| 4,319,011 A | 3/1982 | Lowery, Jr. et al. |
| 4,547,475 A | 10/1985 | Glass et al. |
| 4,612,300 A | 9/1986 | Coleman, III |
| 4,820,672 A | 4/1989 | Mehta |
| 5,120,696 A | 6/1992 | Tsutsui et al. |
| 5,145,818 A | 9/1992 | Tsutsui et al. |
| 5,519,098 A | 5/1996 | Brown et al. |
| 5,539,076 A | 7/1996 | Nowlin et al. |
| 5,919,983 A | 7/1999 | Rosen et al. |
| 6,034,022 A | 3/2000 | McAdon et al. |
| 6,136,747 A | 10/2000 | Kao et al. |
| 6,723,677 B1 | 4/2004 | Estrada et al. |
| 6,831,032 B2 | 12/2004 | Spaether |
| 7,592,286 B2 | 9/2009 | Morini et al. |
| 8,058,373 B2 | 11/2011 | Stevens et al. |
| 8,664,343 B2 | 3/2014 | Qin et al. |
| 8,907,029 B2 | 12/2014 | Wang et al. |
| 9,255,160 B2 | 2/2016 | Desjardins et al. |
| 2006/0128913 A1 | 6/2006 | Gibson et al. |
| 2014/0088275 A1 | 3/2014 | Richter-Lukesova et al. |
| 2016/0046745 A1 | 2/2016 | Wang et al. |
| 2018/0265604 A1 | 9/2018 | Figueroa et al. |
| 2018/0282452 A1 | 10/2018 | Fontaine et al. |

FOREIGN PATENT DOCUMENTS

| | | |
|---|---|---|
| GB | 1286867 | 8/1972 |
| JP | H05186523 | 7/1993 |
| JP | 3529929 | 5/2004 |
| WO | 1996012762 | 5/1996 |
| WO | 1999/50318 | 10/1999 |
| WO | 2007/136494 | 11/2007 |
| WO | 2016/003878 | 1/2016 |

OTHER PUBLICATIONS

PCT/US2017/052601, International Preliminary Report on Patentability dated Apr. 2, 2019.
PCT/US2017/052601, International Search Report and Written Opinion dated Nov. 29, 2017.
R. Huang, et al., Macromolecules, 2007, pp. 3021-3029, vol. 40.
S. Damavandi et al. FI Catalyst for Polymer of Olefin, INTECH, 2012, pp. 117-145.
T.O. Ahn, et al., Polymer Engineering and Science, 1999, pp. 1257-1264, vol. 39, No. 7.
Redzic et al., Iranian Polymer Journal, 2016, vol. 25, pp. 321-337.
Valencia López et al., International Journal of Polymer Science, 2014, vol. 2014, pp. 519203: 1-8.
Y. Choi et., Synthesis of Supported Nickel Diimine Catalysts for Ethylene Slurry Polymerization, 2009, pp. 1979-1988, vol. 210.

*Primary Examiner* — Catherine S Branch

(57) ABSTRACT

A modified Ziegler-Natta procatalyst that is a product mixture of modifying an initial Ziegler-Natta procatalyst with a molecular (pro)catalyst, and optionally an activator, the modifying occurring before activating the modified Ziegler-Natta procatalyst with an activator and before contacting the modified Ziegler-Natta procatalyst with a polymerizable olefin. Also, a modified catalyst system prepared therefrom, methods of preparing the modified Ziegler-Natta procatalyst and the modified catalyst system, a method of polymerizing an olefin using the modified catalyst system, and a polyolefin product made thereby.

10 Claims, No Drawings

MODIFIED ZIEGLER-NATTA (PRO) CATALYSTS AND SYSTEM

FIELD

The field includes procatalysts, olefin polymerization catalysts, methods of synthesis, methods of polymerizing an olefin, and polyolefins made thereby.

INTRODUCTION

Olefins may be polymerized in gas phase, slurry phase, or solution phase polymerization processes comprising reactions catalyzed by molecular catalysts or Ziegler-Natta catalysts. Molecular catalysts are prepared by contacting molecular procatalysts with an aluminoxane such as a methylaluminoxane or boron-based activator such as a (per)fluorophenylboron compound.

Ziegler-Natta catalysts are prepared by contacting Ziegler-Natta procatalysts comprising titanium halides on a magnesium chloride support with an alkylaluminum activator such as triethylaluminum (TEA), triisobutylaluminum (TIBA), diethylaluminum chloride (DEAC), diethylaluminum ethoxide (DEAE), or ethylaluminum dichloride (EADC).

U.S. Pat. No. 4,612,300 to W. M. Coleman, III, mentions a novel catalyst for producing relatively narrow molecular weight distribution olefin polymers. Employs a Ziegler-Natta magnesium halide supported catalyst containing both titanium and vanadium. Catalyst must contain a sufficient quantity of hydrocarbylaluminum, aluminum halide, or combination thereof.

WO 95/11264 A1 to T. E. Nowlin et al. (NOWLIN) mentions polyolefin blends of bimodal molecular weight distribution.

WO 96/12762 A1 to J. A. DeGroot et al. (DEGROOT) mentions polyolefin compositions exhibiting heat resistivity, low hexane-extractives and controlled modulus.

U.S. Pat. No. 6,723,677 B1 to J. V. Estrada et al. (ESTRADA) mentions a high activity Ziegler-Natta catalyst for high molecular weight polyolefins. By controlling the holdup times, concentrations and temperatures for mixing the components of aluminum, titanium and magnesium based catalyst for solution polymerization it is possible to prepare a catalyst having a high activity, which prepares high molecular weight polyolefins. Generally, a catalyst loses activity and produces lower molecular weight polymer at higher temperatures. The catalyst permits comparable polymers to be produced with higher catalyst activity and at higher reaction temperatures by increasing the concentration of the components used during the preparation of the catalyst.

U.S. Pat. No. 7,592,286 B2 to G. Morini, et al. mentions a process for the preparation of a catalyst component and components therefrom obtained. Catalyst component comprises a Mg compound, a Ti compound and an electron donor compound (ED) selected from alcohol, glycols, esters, ketones, amines, amides, nitriles, alkoxysilanes and aliphatic ethers as essential compounds, comprising two or more steps of reaction involving the use of at least one of said essential compounds as fresh reactant alone or in a mixture in which it constitutes the main component, said process being characterized by the fact that in the last of said one or more reaction steps the essential compound used as a fresh reactant is the ED compound.

US 2014/0088275 A1 to L. Richter-Lukesova et al mentions a process for manufacture of a mixed catalyst system for the copolymerization of ethylene with c1-C12 alpha-olefins.

U.S. Pat. No. 9,255,160 B2 to S. Desjardins, et al. mentions multi-metallic Ziegler-Natta procatalysts and catalysts prepared therefrom for olefin polymerizations. Catalyst compositions comprising three or more transition metals increase catalyst efficiency, reduce polydispersity, and increase uniformity in molecular weight distribution when used in olefin, and particularly, linear low density polyethylene (LLDPE), polymerizations. Resulting polymers may be used to form films that may exhibit improved optical and mechanical properties.

SUMMARY

A hybrid catalyst comprises a Ziegler-Natta catalyst and a supported molecular catalyst for use, at the same time, in a single reactor for gas phase and slurry phase polymerization processes to produce polyolefin compositions comprising a polyolefin macromolecules produced with a molecular catalyst and polyolefin macromolecules produced with a Ziegler-Natta catalyst. Others have found it necessary to support the molecular catalyst onto the Ziegler-Natta catalyst. This is because morphology control of catalyst particles is critical for gas phase and slurry phase polymerization processes in order to ensure process continuity. But such prior pre-formed hybrid catalysts have drawbacks. The relative contribution of the Ziegler-Natta catalyst and the supported molecular catalyst for forming polyolefin macromolecules cannot be easily adjusted in the hybrid catalyst. Instead a different hybrid catalyst must be synthesized for each polyolefin composition targeted. Also, prior processes of synthesizing hybrid catalysts are complicated and lengthy. A typical synthesis comprises activating an unsupported molecular procatalyst with methylaluminoxane to give an unsupported molecular catalyst, supporting at least some of the unsupported molecular catalyst onto a Ziegler-Natta catalyst particles to give a hybrid catalyst, and removing any remaining unsupported molecular catalyst from the hybrid catalyst to give a hybrid catalyst composed of a supported molecular catalyst on a Ziegler-Natta catalyst and free of unsupported molecular catalyst. Ziegler-Natta catalysts used to make such hybrid catalysts are mostly limited to silica-supported Ziegler-Natta catalysts.

We (the present inventors) realized that high temperature solution polymerization would be a more suitable process for using a molecular catalyst and a Ziegler-Natta catalyst at the same time in the same reactor since the requirements on particle morphology control no longer exist. Solution phase polymerizations using a Ziegler-Natta procatalyst and a molecular procatalyst can be further simplified if one could find a way to use only one catalyst feed comprising a premixture of the Ziegler-Natta procatalyst and molecular (pro)catalyst that can preserve at least a portion of the catalytic activity of the molecular catalyst. The premixture may be used as a single procatalyst. The polyolefin composition produced using the premixture may be composed of polyolefin macromolecules that are different in structure or composition and may have improved properties than the polyolefin macromolecules and properties produced by single catalysts.

We conceived a technical solution that provides a modified Ziegler-Natta procatalyst that is a product mixture of modifying an initial Ziegler-Natta procatalyst with a molecular (pro)catalyst, and optionally an activator, the modifying occurring before activating the modified Ziegler-Natta procatalyst with an activator and before contacting the modified Ziegler-Natta procatalyst with a polymerizable olefin. Also, a modified catalyst system prepared therefrom, methods of preparing the modified Ziegler-Natta procatalyst and the modified catalyst system, a method of polymerizing an olefin using the modified catalyst system, and a polyolefin product made thereby.

DETAILED DESCRIPTION

The Brief Summary and Abstract are incorporated here by reference. Examples of embodiments include the following numbered aspects.

Aspect 1. A method of polymerizing an olefin using a modified catalyst system that comprises a product of reaction of a modified Ziegler-Natta procatalyst with an activator in (C) a saturated or aromatic hydrocarbon liquid, the method comprising contacting at least one polymerizable olefin in a reactor with the modified catalyst system under effective conditions to give a polyolefin product; wherein the modified Ziegler-Natta procatalyst is prepared prior to the contacting step by mixing an initial Ziegler-Natta procatalyst and a molecular (pro)catalyst together in (C) a saturated or aromatic hydrocarbon liquid under modifying conditions comprising a modifying temperature less than 100° C. and a modifying time of at least 1 minute, and optionally an activator, to give the modified Ziegler-Natta procatalyst. The modified Ziegler-Natta procatalyst is different in at least one of composition, structure, activity, function than a mixture of the initial (unmodified) Ziegler-Natta catalyst and molecular (pro)catalyst, and, if present, the activator.

Aspect 2. The method of aspect 1 (i) wherein the initial Ziegler-Natta procatalyst is (B) a magnesium halide-supported titanium procatalyst; wherein the (B) magnesium halide-supported titanium procatalyst has been prepared by contacting (D) a solid particulate consisting essentially of magnesium halide with (E) titanium tetrachloride in the (C) saturated or aromatic hydrocarbon liquid so as to give the (B) magnesium halide-supported titanium procatalyst; (ii) wherein the molecular (pro)catalyst consists essentially of a molecular ligand-metal complex (pro)catalyst; or (iii) both (i) and (ii). The (C) saturated or aromatic hydrocarbon liquid in which (B) is prepared may be the same (C) saturated or aromatic hydrocarbon liquid in which the modified Ziegler-Natta procatalyst is prepared (e.g., one-pot preparations) and the same (C) saturated or aromatic hydrocarbon liquid in which the modified catalyst system is prepared.

Aspect 3. The method of aspect 1 or 2 wherein the modifying conditions comprise: (i) a modifying temperature from 0° C. to 50° C.; (ii) a modifying time from 2 hours to 3 months; (iii) an inert gas atmosphere (e.g., $N_2$, helium, argon, or a mixture of any two or more thereof); (iv) both (i) and (ii); (v) both (i) and (iii); (vi) both (ii) and (iii); or (vii) each of (i), (ii), and (iii).

Aspect 4. The method of aspect 1 or 2 or 3 wherein the modified catalyst system further comprises (G) an organoborate or (H) an organoboron.

Aspect 5. The method of any one of aspects 1 to 4 wherein: (i) the at least one polymerizable olefin is ethylene and the polyolefin product comprises a polyethylene; (ii) the at least one polymerizable olefin is at least one ($C_3$-$C_{40}$) alpha-olefin and the polyolefin product comprises a poly(($C_3$-$C_{40}$)alpha-olefin); or (iii) the at least one polymerizable olefin is a combination of ethylene and at least one ($C_3$-$C_{40}$) alpha-olefin and the polyolefin product comprises a poly(ethylene-co-($C_3$-$C_{40}$)alpha-olefin) copolymer.

Aspect 6. The method of any one of aspects 1 to 5 wherein: (i) the initial magnesium halide-supported titanium procatalyst is free of Al (molar ratio Al/Mg=0); (ii) the initial magnesium halide-supported titanium procatalyst is characterized by a molar ratio of Al/Mg from >0 to <0.05; (iii) the magnesium halide of the initial magnesium halide-supported titanium procatalyst is magnesium chloride; (iv) the magnesium halide of the initial magnesium halide-supported titanium procatalyst is magnesium bromide; (v) both (i) and (iii); (vi) both (i) and (iv); (vii) both (ii) and (iii); (viii) both (ii) and (iv).

Aspect 7. The method of any one of aspects 1 to 6 wherein: (i) the (D) solid particulate consisting essentially of magnesium halide has a Brunauer, Emmett, Teller (BET) surface area of ≥200 square meters per gram ($m^2$/g) as measured by BET Surface Area Method, described late; or (ii) the (D) solid particulate consisting essentially of magnesium halide has been prepared by contacting a solution of (F) a dialkylmagnesium compound dissolved in the (C) saturated or aromatic hydrocarbon liquid with 1.95 to 2.05 mole equivalents of hydrogen halide to give a suspension of the (D) solid particulate consisting essentially of magnesium halide in the (C) saturated or aromatic hydrocarbon liquid; or (iii) both (i) and (ii). Alternatively, (iv) the (D) solid particulate consisting essentially of magnesium halide has been prepared by contacting a solution of (F) a dialkylmagnesium compound dissolved in the (C) saturated or aromatic hydrocarbon liquid with 1.95 to 2.05 mole equivalents of hydrogen halide (anhydrous) to give a suspension of the (D) solid particulate consisting essentially of magnesium halide in the (C) saturated or aromatic hydrocarbon liquid, wherein the dialkylmagnesium compound is diethylmagnesium, dipropylmagnesium, dibutylmagnesium, butyl-ethyl-magnesium, butyl-octyl-magnesium, or a combination thereof; or (v) both (i) and (iv).

Aspect 8. The method of any one of aspects 1 to 7 wherein the (C) a saturated or aromatic hydrocarbon liquid is: (i) a saturated hydrocarbon liquid; or (ii) an aromatic hydrocarbon liquid; or (iii) a mixture of saturated hydrocarbon and aromatic hydrocarbon liquids.

Aspect 9. The method of any one of aspects 1 to 7 wherein the activator used with the modified Ziegler-Natta procatalyst comprises (A) a hydrocarbylaluminoxane. In some aspects (A) is an alkylaluminoxane, a polymethylaluminoxane, an arylaluminoxane, an aralkylaluminoxane, or a combination of any two or more thereof.

Aspect 10. The method of any one of aspects 2 to 9 wherein the molecular ligand-metal complex (pro)catalyst comprises: (i) a cyclopentadienyl ligand-metal complex (pro)catalyst; (ii) a cyclopentadienyl-free ligand-metal complex (pro)catalyst; or (iii) both (i) and (ii).

Aspect 11. The method of any one of aspects 1 to 10 wherein the contacting comprises: (i) adding the modified catalyst system into the reactor, which contains the at least one polymerizable olefin; (ii) adding the at least one polymerizable olefin into the reactor, which contains the modified catalyst system; or (iii) adding a first feed of the modified catalyst system into the reactor and a second feed of the at least one polymerizable olefin into the reactor. The first and second feeds may be added sequentially or simultaneously, or partly both.

Aspect 12. A solution phase polymerization process of polymerizing an olefin using a modified catalyst system that is a product of a reaction of a modified Ziegler-Natta procatalyst with an activator, the process comprising contacting at least one polymerizable olefin in the reactor with the modified catalyst system under effective conditions to give a polyolefin product; wherein the modified Ziegler-Natta procatalyst is prepared prior to the contacting step by mixing an initial Ziegler-Natta procatalyst and a molecular ligand-metal complex precatalyst together under modifying conditions comprising a modifying temperature less than 100° C. and a modifying time of at least 1 minute, and optionally an activator, to give the modified Ziegler-Natta procatalyst. The initial Ziegler-Natta catalyst may be (B) a magnesium halide-supported titanium procatalyst in (C) a saturated or aromatic hydrocarbon liquid; wherein the (B) magnesium halide-supported titanium procatalyst has been prepared by contacting (D) a solid particulate consisting essentially of magnesium halide with (E) titanium tetrachloride in the (C) a saturated or aromatic hydrocarbon liquid so as to give the (B) magnesium halide-supported titanium procatalyst. The molecular (pro)catalyst consists essentially of a molecular ligand-metal complex (pro)catalyst.

Aspect 13. A polyolefin product made by the method of any one of aspects 1 to 12.

Aspect 14. A modified Ziegler-Natta procatalyst as described in any preceding aspect.

Aspect 15. The catalyst system of aspect 14 (i) further comprising a (A) hydrocarbylaluminoxane; (ii) further comprising an organoborate or an organoboron; (iii) further comprising a trialkylaluminum; (iv) being free of a trialkylaluminum; (v) both (i) and (ii); (vi) both (i) and (iii); (vii) both (i) and (iv); (viii) each of (i), (ii), and (iv).

Aspect 16. A modified catalyst system comprising a product of a reaction of the modified Ziegler-Natta procatalyst of aspect 14 or 15 with an activator.

Aspect 17. The modified catalyst system of aspect 16 further comprising (C) a saturated or aromatic hydrocarbon liquid, a polymerizable olefin, a polyolefin, or a combination of any two or more thereof.

Modified Ziegler-Natta procatalyst. The modified Ziegler-Natta procatalyst may further comprise an activator. The modified Ziegler-Natta procatalyst is a product of mixing the initial Ziegler-Natta procatalyst with the molecular (pro)catalyst, and optionally an activator which may be the same as or different than the activator used with the modified Ziegler-Natta procatalyst to make the modified catalyst system, in such a way that the initial Ziegler-Natta procatalyst is modified by the molecular (pro)catalyst such that polyolefin composition produced with the modified catalyst system is different than the polyolefin composition that is produced with the initial Ziegler-Natta procatalyst. The difference in composition may found in at least one of the following properties: polyolefin density, polyolefin molecular weight, comonomer distribution, or short chain branching distribution. The initial Ziegler-Natta procatalyst is prepared prior to the mixing step. The modified catalyst system may be prepared in the reactor or outside of the reactor used in the polymerization method. The modified Ziegler-Natta procatalyst may be prepared for a modifying time from 1 minute to 24 months, alternatively 2 minutes to 12 months, alternatively 3 minutes to 3 months, alternatively 3 hours to 3 months, alternatively 1 month to 24 months, alternatively 1 month to 12 months, alternatively 1 minute to 48 hours, 2 minutes to 24 hours, alternatively from 3 minutes to 12 hours before the contacting step; and at a modifying temperature from 0° to 100° C., alternatively 0° to 80° C., 0° to 60° C., alternatively 10° to 55° C., alternatively 15° to 50° C. The length of modifying time may be adjusted based on the modifying temperature being used, or vice versa, in such a way that the higher the modifying temperature, the shorter may be the modifying time, or vice versa; or the lower the modifying temperature, the longer may be the modifying time, or vice versa.

Molecular (pro)catalyst. The term "(pro)catalyst" means a procatalyst; a catalyst, which is prepared by contacting the procatalyst with at least one activator; or a combination of the procatalyst and the catalyst. In some aspects the (pro)catalyst is the procatalyst, alternatively the catalyst, alternatively the combination of the procatalyst and the catalyst. Molecular (pro)catalysts for olefin polymerizations are well-known in the art. The molecular (pro)catalyst may be a homogeneous single site (pro)catalyst that, upon activation with an activator, is effective for polymerizing ethylene and alpha-olefins. The molecular (pro)catalyst generally may exhibit single-site or multi-site behaviors upon activation with an activator and under polymerization conditions. The molecular (pro)catalyst is distinct from the Ziegler-Natta procatalyst in solubility, structure, and composition. The molecular (pro)catalyst may be supported or unsupported; soluble in constituent (C) saturated or aromatic hydrocarbon liquid or insoluble therein. In some aspects the molecular (pro)catalyst is unsupported. The molecular (pro)catalyst may be selected from any molecular ligand-transition metal complex catalyst in which the transition metal is a Group 3 to 11 element of the Periodic Table of Elements, including the lanthanides and actinides. The molecular ligand-metal complex (pro)catalyst may be a molecular ligand-metal complex procatalyst, alternatively a molecular ligand-metal complex catalyst, alternatively a combination of the molecular ligand-metal complex procatalyst and the molecular ligand-metal complex catalyst. In some aspects the transition metal is Ti, Zr, Hf, V, or Cr. In some aspects the transition metal is selected from the group of any four of Ti, Zr, Hf, V, and Cr. In some aspects the transition metal is Fe, Co, Ni, or Pd. In some aspects the transition metal is selected from the group of any three of Fe, Co, Ni, and Pd. In some aspects the molecular (pro)catalyst is a transition metal complex (pro)catalyst useful in solution under high temperature solution process conditions. In some aspects the molecular (pro)catalyst may be selected from any one or more of bis-phenylphenoxy (pro)catalysts, constrained geometry (pro)catalysts, imino-amido type (pro)catalysts, pyridyl-amide (pro)catalysts, imino-enamido (pro)catalysts, aminotroponiminato (pro)catalysts, amidoquinoline (pro)catalysts, bis(phenoxy-imine) (pro)catalysts, phosphinimide (pro)catalysts, and metallocene (pro)catalysts.

The molecular procatalyst used in some embodiments to prepare the modified catalyst system may be used to prepare a molecular catalyst that consists essentially of a product of a reaction of a molecular ligand-metal complex procatalyst with an activator such as (A) a hydrocarbylaluminoxane and/or (I) a trialkylaluminum and/or (G) organoborate and/or (H) organoboron. The (A) hydrocarbylaluminoxane used in the reaction to prepare the molecular catalyst independently may be the same as or different than the (A) hydrocarbylaluminoxane used in a reaction to prepare a Ziegler-Natta catalyst from the Ziegler-Natta procatalyst.

In some aspects the molecular ligand-metal complex (pro)catalyst is the cyclopentadienyl (Cp) ligand-metal complex (pro)catalyst, which is useful for preparing so-called metallocene catalysts. Examples of suitable cyclopentadienyl ligand-metal complex (pro)catalysts are $Cp_2ZrCl_2$; rac-$Et(Ind)_2ZrCl_2$, wherein rac means racemic and $Et(Ind)_2$ is 1,2-di(1-indenyl)ethane dianion; $iPr(Flu)(Cp)ZrCl_2$, wherein iPr(Flu)(Cp) is 9-(alpha,alpha-dimethylcyclopentadienylmethyl)-9H-fluorene dianion.

In some aspects the molecular ligand-metal complex (pro)catalyst is the cyclopentadienyl-free ligand-metal complex (pro)catalyst, which is useful for preparing so-called post-metallocene catalysts, including constrained geometry catalysts. Examples of suitable cyclopentadienyl-free ligand-metal complex (pro)catalysts are a phenoxy-imine ligand-early transition metal complex (pro)catalyst (FI (pro) catalyst), a pyrrolide-imine ligand-Group 4 transition metal complex (pro)catalyst (PI (pro)catalyst), an indolide-imine ligand-Ti complex (II (pro)catalyst), a phenoxy-imine ligand-Group 4 transition metal complex (pro)catalyst (IF (pro)catalyst), a phenoxy-ether ligand-Ti complex (pro)catalyst (FE (pro)catalyst), an imine-pyridine ligand-late transition metal complex (pro)catalyst (IP (pro)catalyst), and a tris(pyrazolyl) borate ligand-Ta complex (pro)catalyst (PB (pro)catalyst).

Additional examples of suitable molecular ligand-metal complex (pro)catalysts are (TTSi)CpTiCl$_2$, wherein (TTSi) Cp is 1,2,3,4-tetramethyl-5-(trimethylamino(dimethyl)silyl) cyclopentadienyl; and the molecular ligand-metal complex (pro)catalysts described in any one of: U.S. Pat. No. 6,827, 976; US 2004/0010103 A1; U.S. Pat. No. 8,058,373 B2, at column 11, line 35, to column 16, line 3; complexes of formula (I) described in WO 2016/003878 A1; the fused ring substituted indenyl metal complexes described in U.S. Pat. No. 6,034,022; the constrained geometry metal (pro)catalysts referenced in the Background of U.S. Pat. No. 6,034, 022; the ligand-metal complexes described in U.S. 62/234, 910 filed Sep. 30, 2015; the ligand-metal complexes described in U.S. 62/234,791 filed Sep. 30, 2015; a phosphinimine; and bis((2-oxoyl-3-(3,5-bis-(1,1-dimethylethyl) phenyl)-5-(methyl)phenyl)-(5-2-methyl)propane-2-yl)2-phenoxy)-1,3-propanediyl zirconium (IV)dimethyl, which is disclosed in WO 2007/136494.

Magnesium halide-supported titanium procatalyst. In some aspects the initial Ziegler-Natta procatalyst is the (B) magnesium halide-supported titanium procatalyst. The magnesium halide-supported titanium procatalyst used to make the modified catalyst system may be activated to give a magnesium halide-supported titanium catalyst by contacting the (B) with an activator that is (A) hydrocarbylaluminoxane, (G) organoborate, (H) organoboron, or a trialkylaluminum compound. The contacting may comprise a suspension of (B) in (C) saturated or aromatic hydrocarbon liquid and may be done in or under an inert atmosphere (e.g., a gas of molecular nitrogen, argon, helium, or mixture thereof) at 0° to 300° C., alternatively 15° to 250° C. and for a time of from >0 minute to 48 hours, alternatively 0.1 minute to 24 hours, alternatively 5 to 120 seconds. Examples of suitable trialkylaluminum compounds are of formula $(C_1-C_{20})alkyl)_3Al$, wherein each $(C_1-C_{20})alkyl$ is independently the same or different. In some aspects the trialkylaluminum compound is triethylaluminum, triisobutylaluminum, or a combination of any two or more thereof. The (B) magnesium halide-supported titanium procatalyst may consist essentially of, or consist of, the following elements: Cl, Mg, and Ti; and the suspension of the (B) magnesium halide-supported titanium procatalyst in (C) saturated or aromatic hydrocarbon liquid may consist essentially of, or consist of, C, H, Cl, Mg, and Ti. When the (B) magnesium halide-supported titanium procatalyst is contacted with the (A) hydrocarbylaluminoxane, the resulting Ziegler-Natta catalyst is an enhanced Ziegler-Natta catalyst.

Enhanced Ziegler-Natta catalyst. In some aspects the Ziegler-Natta catalyst is the enhanced Ziegler-Natta catalyst. The enhanced Ziegler-Natta catalyst may be made by contacting the (A) hydrocarbylaluminoxane with the suspension of (B) magnesium halide-supported titanium procatalyst in (C) saturated or aromatic hydrocarbon liquid so as to activate the (B) magnesium halide-supported titanium procatalyst and give the enhanced catalyst. The formation of the enhanced catalyst may be done in situ in a polymerization reactor or just prior to entering the polymerization reactor. The contacting of (A) with suspension of (B) in (C) may be done in or under an inert atmosphere (e.g., a gas of molecular nitrogen, argon, helium, or mixture thereof) at 0° to 300° C., alternatively 15° to 250° C. and for a time of from >0 minute to 48 hours, alternatively 0.1 minute to 24 hours, alternatively 5 to 120 seconds. The catalytic activity of the enhanced catalyst is greater than the catalytic activity of a magnesium halide-supported titanium catalyst prepared by contacting (B) with the trialkylaluminum compound. In some aspects catalytic activity of the enhanced catalyst may be further enhanced by also contacting (B) and (A) with the (G) organoborate or the (H) organoboron. The enhanced catalyst may consist essentially of, or consist of, the following elements: Al, C, H, Cl, Mg, O, and Ti.

In some aspects the enhanced catalyst and the (B) magnesium halide-supported titanium procatalyst, used to make the enhanced Ziegler-Natta catalyst, are independently characterized by a molar ratio of Ti to halogen. For example, $0 \leq (N_X - 80 - 4*N_{Ti}) \leq 6$, alternatively $0 \leq (N_X - 80 - 4*N_{Ti}) \leq 4$, alternatively $0 \leq (N_X - 80 - 4*N_{Ti}) \leq 2$; wherein $N_{Ti}$=moles of Ti per 40 moles of Mg in the catalyst and $N_X$=moles of halogen per 40 moles of Mg in the catalyst. In some aspects X is Cl, alternatively Br.

The (A): hydrocarbylaluminoxane or HAO. The alkylaluminoxane may be a polymeric form of a $(C_1-C_{10})$alkylaluminoxane or a polymethylaluminoxane (PMAO). The PMAO may be a polymethylaluminoxane-Improved Performance (PMAO-IP), which is commercially available from AkzoNobel. The $(C_1-C_{10})$alkylaluminoxane may be methylaluminoxane (MAO), a modified methylaluminoxane (MMAO) such as modified methylaluminoxane, type 3A (MMAO-3A), type 7 (MMAO-7), or type 12 (MMAO-12), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, or 1-methylcyclopentylaluminoxane. The arylaluminoxane may be a $(C_6-C_{10})$arylaluminoxane, which may be phenylaluminoxane, 2,6-dimethylphenylaluminoxane, or naphthylaluminoxane. The aralkylaluminoxane may be benzylaluminoxane or phenethylaluminoxane. Typically, the compound (A) is MAO, MMAO, PMAO, or PMAO-IP. The hydrocarbylaluminoxane may be made by a non-hydrolytic process using, or by partial hydrolysis of, trihydrocarbylaluminum compounds according to well-known methods or may be obtained from a commercial source.

The magnesium halide-supported titanium procatalyst. The magnesium halide-supported titanium procatalyst may be any Ziegler-Natta procatalyst that, upon activation, is effective for catalyzing polymerization of ethylene and alpha-olefins. The magnesium halide-supported titanium procatalyst may be prepared by adding a titanium halide to a magnesium chloride support or by converting a titanium compound (e.g., a titanium tetraalkoxide such as a titanium tetraisopropoxide) and magnesium compound (e.g., dialkylmagnesium) into their respective metal halide forms. In some aspects the magnesium halide-supported titanium procatalyst is the inventive (B) magnesium halide-supported titanium procatalyst. The preparation (B) may comprise the step of contacting (D) a solid particulate consisting essentially of magnesium halide with (E) titanium tetrachloride in (C) a saturated or aromatic hydrocarbon liquid to give the (B). The preparation may be done in or under an inert atmosphere (e.g., a gas of molecular nitrogen, argon, helium, or mixture thereof) at 0° to 100° C., alternatively 20° to 35° C. and for a time of from 0.1 minute to 24 hours, alternatively 5 to 12 hours. The (D) used to prepare the (B) may be prepared as described below. The suspension of (B) in (C) may be used in the next step without being separated from each other. When prepared in this way it is not necessary to separate the (B) from the (C) and a suspension of the (B) in (C) a saturated or aromatic hydrocarbon liquid may be used directly, in a one-pot syntheses, with the trialkylaluminum compound or the (A) hydrocarbylaluminoxane to prepare the magnesium halide-supported titanium catalyst or the enhanced catalyst, respectively. (In contrast, additional alkylaluminum halide or aluminum halide compound(s) are typically used to prepare a standard (non-inventive) halide-containing Ziegler-Natta catalyst.) In some aspects, the magnesium halide-supported titanium procatalyst may be any conventional Ziegler-Natta procatalyst. In some aspects, the conventional magnesium halide-supported titanium procatalyst may be a Ziegler-Natta procatalyst comprising titanium chloride, $MgCl_2$, and optionally one or more transition metals (e.g., an element of any one of Groups 4 to 13 of the Periodic Table of the Elements). In some aspects the magnesium halide-supported titanium procatalyst may be the inventive (B) magnesium halide-supported titanium procatalyst. The (B) may be distinguished from a conventional magnesium halide-supported titanium procatalysts by virtue of how (B) is prepared, as described herein.

A polyolefin prepared by a polymerization reaction using a standard halide-containing Ziegler-Natta catalyst may have a higher residual active halide content. The actual content may vary within limits as follows: proportionally with the starting halide content in the corresponding standard Ziegler-Natta procatalyst and/or inversely proportional with the activity of the Ziegler-Natta catalyst prepared therefrom. In some aspects the magnesium halide-supported titanium procatalyst has been prepared in such a way so as to have a low residual active halide content, such as in the (B), and thus the magnesium halide-supported titanium catalyst prepared therefrom with the trialkylaluminum compound and the enhanced catalyst prepared therefrom with the (A) hydrocarbylaluminoxane also have low residual active halide content, and thus the product polyolefin prepared by the polymerization method using the modified catalyst system also has low residual active halide content. Active halide impurity means a metal-halide containing compound that, when exposed to moisture or water under ambient conditions (e.g., 25° C. and 101 kPa pressure) undergoes a hydrolysis reaction yielding a hydrogen halide (e.g., HCl).

In some aspects the (B) magnesium halide-supported titanium procatalyst has a total metal content of 94 to 100 mol %, alternatively 96 to 100 mol %, alternatively 98 to 99.5 mol % of Ti and Mg. The suspension of (B) magnesium halide-supported titanium procatalyst in (C) saturated or aromatic hydrocarbon liquid may consist essentially of, or consist of, the following elements: C, H, Cl, Mg, and Ti.

The (C) saturated or aromatic hydrocarbon liquid. The compound (C) saturated or aromatic hydrocarbon liquid may be any unsubstituted saturated or aromatic hydrocarbon liquid such as an unsubstituted aromatic hydrocarbon or an unsubstituted alkane. The unsubstituted aromatic hydrocarbon may be toluene or xylene(s). The unsubstituted alkane may be a straight chain alkane, a branched chain alkane such as an isoalkane or mixture of isoalkanes such as ISOPAR E, a cycloalkane such as cycloheptane or methylcyclohexane, or a mixture of any two or more thereof. Suitable (C) saturated or aromatic hydrocarbon liquid are available from commercial sources such as isoalkanes available from ExxonMobil Corp.

In some aspects the (C) saturated or aromatic hydrocarbon liquid in which a first product is prepared may be removed from the first product, and a different (C) material combined with the first product prior to preparing the next product therefrom. The removing may be by methods such as stripping, evaporating, distilling, filtering, or "solvent" exchanging. In other aspects at least some of the (C) saturated or aromatic hydrocarbon liquid in which a first product is prepared is carried through with the first product to a preparation of a next product, which is prepared from the first product, without all or any of the (C) being removed from the first product. This carry through may be accomplished using one-pot preparation methods, which are generally well known in the art. The following examples (i) to (v) of the latter aspects may use one-pot preparation methods: (i) the (C) saturated or aromatic hydrocarbon liquid in which the (D) solid particulate is prepared (see below) may be the same as the (C) saturated or aromatic hydrocarbon liquid in which the magnesium halide-supported titanium procatalyst is prepared, such as the (C) in which the inventive (B) magnesium halide-supported titanium procatalyst is prepared; (ii) the (C) saturated or aromatic hydrocarbon liquid in which the (B) magnesium halide-supported titanium procatalyst is prepared may be the same as the (C) saturated or aromatic hydrocarbon liquid in which the inventive enhanced catalyst is prepared; (iii) the (C) saturated or aromatic hydrocarbon liquid in which the magnesium halide-supported titanium procatalyst (such as (B)) is prepared may be the same as the (C) saturated or aromatic hydrocarbon liquid in which the modified Ziegler-Natta procatalyst is prepared; (iv) the (C) saturated or aromatic hydrocarbon liquid in which the modified Ziegler-Natta procatalyst is prepared may be the same as the (C) saturated or aromatic hydrocarbon liquid in which the modified catalyst system is prepared; or (v) any two or more of examples (i) to (iv), e.g., (i) and (ii), (ii) and (iii), (iii) and (iv), or all of (i) to (iv).

The (D) solid particulate consisting essentially of magnesium halide. The compound (D) is prepared as described above. The contacting a solution of (F) a dialkylmagnesium compound dissolved in (C) saturated or aromatic hydrocarbon liquid with 1.95 to 2.05 mole equivalents of hydrogen halide to give the (D) solid particulate consisting essentially of magnesium halide may be done in or under an inert atmosphere (e.g., a gas of molecular nitrogen, argon, helium, or mixture thereof) at −25° to 100° C., alternatively 0° to 50° C. and for a time of from 0.1 minute to 10 hours, alternatively 1 to 6 hours. The suspension of (D) in (C) may be used without being separated from each other. It is not necessary to separate the (D) from the (C) and the (D) prepared in this way is unconditioned and may be used directly, in a one-pot syntheses, to prepare the (B) magnesium halide-supported titanium procatalyst. Alternatively, the (D) may be conditioned by contacting it with a conditioning compound containing V, Zr, or Hf at 0° to 50° C., alternatively 20° to 35° C., and for a time of from 0.1 minute to 24 hours, alternatively 1 to 12 hours to form a conditioned (D). The suspension of conditioned (D) in (C) may be used without being separated from each other. It is not necessary to separate the conditioned (D) from the (C) and the conditioned (D) prepared in this way may be used directly, in a one-pot syntheses, to prepare the (B) magnesium halide-supported titanium procatalyst. When prepared in this way a suspension of the (D), unconditioned or conditioned, in (C) saturated or aromatic hydrocarbon liquid may be contacted with (E) titanium tetrachloride so as to give the (B) magnesium halide-supported titanium procatalyst.

The (D) solid particulate consisting essentially of magnesium halide may have a BET surface area of $\geq 200$ m$^2$/g, alternatively >250 m$^2$/g, alternatively >300 m$^2$/g; and a maximum BET surface area of 1,500 m$^2$/g, alternatively 1,000 m$^2$/g, alternatively 500 m$^2$/g, alternatively 300 m$^2$/g, all as measured by the BET Surface Area Method. When the halide is chloride, the magnesium halide is MgCl$_2$ and when the halide is bromide, the magnesium halide is MgBr$_2$.

The suspension of (D) solid particulate consisting essentially of magnesium halide in (C) saturated or aromatic hydrocarbon liquid may consist essentially of, or consist of, the following elements: C, H, Cl, and Mg. The suspension of (D) may have a halide to magnesium ratio of 1.5 to 2.5, alternatively 1.8 to 2.2, alternatively 1.95 to 2.05.

The (E) titanium tetrachloride is a compound of formula TiCl$_4$, or a solution of TiCl$_4$ in a saturated or aromatic hydrocarbon liquid such as a same or different compound (C) saturated or aromatic hydrocarbon liquid. TiCl$_4$ and the solution thereof are available from commercial sources or may be readily prepared by well-known methods.

The (F) dialkylmagnesium compound may be of formula (I): $R^1MgR^2$ (I), wherein each of $R^1$ and $R^2$ is independently an unsubstituted $(C_1-C_{20})$alkyl group, alternatively an unsubstituted $(C_1-C_{10})$alkyl group, alternatively an unsubstituted $(C_1-C_4)$alkyl group. In some aspects the dialkylmagnesium compound is an unsubstituted $(C_1-C_4)$alkyl group, which is dimethylmagnesium, diethylmagnesium, dipropylmagnesium, isopropyl-methyl-magnesium (i.e., $(CH_3)_2CHMgCH_3$), dibutylmagnesium, butyl-ethyl-magnesium (i.e., $CH_3(CH_2)_3MgCH_2CH_3$), butyl-octyl-magnesium (i.e., $CH_3(CH_2)_3Mg(CH_2)_7CH_3$), or a combination thereof. Dialkylmagnesium compounds are available commercially or may be readily prepared by well-known methods.

The (G) organoborate. Compound (G) may be any organoborate that enhances the method of polymerization using ethylene monomer. In some aspects compound (G) is a methyldi$((C_{14}-C_{18})$alkyl)ammonium salt of tetrakis(pentafluorophenyl)borate, which may be prepared by reaction of a long chain trialkylamine (Armeen™ M2HT, available from Akzo-Nobel, Inc.), HCl and Li[B(C$_6$F$_5$)$_4$]. Such a preparation is disclosed in U.S. Pat. No. 5,919,983, Ex. 2. Or the borate is purchased from Boulder Scientific. The borate may be used herein without (further) purification.

The (H) organoboron. Compound (H) may be any organoboron that enhances the method of polymerization using ethylene monomer. In some aspects compound (E) is a tris(perfluoroaryl)borane such as tris(pentafluorophenyl)borane.

The (I) trialkylaluminum. The trialkylaluminum may be of formula $((C_1-C_{10})$alkyl)$_3$Al, wherein each $(C_1-C_{10})$alkyl is independently the same or different. Each $(C_1-C_{10})$alkyl may be methyl, ethyl, propyl, 1-methylethyl, butyl, 1-methylpropyl, hexyl, or octyl. E.g., triethylaluminum, triisobutylaluminum, tripropylaluminum, tributylaluminum, trihexylaluminum, or trioctylaluminum.

The (J) conditioning compound. The (J) conditioning compound may be zirconium-based, hafnium-based, or vanadium based. E.g., tetrakis(2,2,6,6-tetramethyl-3,5-heptanedionato)zirconium, zirconium tetraisopropoxide, tetrakis(2,2,6,6-tetramethyl-3,5-heptanedionato)hafnium, hafnium tetrapropoxides, tetrakis(2,2,6,6-tetramethyl-3,5-heptanedionato)vanadium, or vanadium tetrapropoxide. Functions to increase Mz/Mw ratio of product polyolefin produced by the polymerization method relative to Mz/Mw ratio of a product polyolefin produced by the polymerization method lacking (J).

Hydrogen halide. The halide of the hydrogen halide used to prepare the (B) magnesium halide-supported titanium procatalyst is the same as the halide of the magnesium halide of the (B) magnesium halide-supported titanium procatalyst. E.g., both are chloride, alternatively both are bromide. Anhydrous. The mole equivalents of hydrogen halide to (F) dialkylmagnesium compound may be 2.00 to 2.05.

Polymerizable olefins. Examples of suitable polymerizable olefins include ethylene $(CH_2CH_2)$ and $(C_3-C_{40})$alpha-olefins. The polymerizable olefin may comprise a mixture of ethylene and a $(C_3-C_{40})$alpha-olefin. The $(C_3-C_{40})$alpha-olefin may be from 0.1 wt % to 20 wt %, alternatively from 0.1 to 15 wt %, alternatively 0.1 to 10 wt %, alternatively 0.1 to 5 wt % of the mixture and ethylene the remainder. The $(C_3-C_{40})$alpha-olefin may be a $(C_3-C_{20})$alpha-olefin, alternatively a $(C_3-C_{12})$alpha-olefin, alternatively a $(C_3-C_8)$alpha-olefin. Examples of the $(C_3-C_8)$alpha-olefin are propene, 1-butene, 1-hexene, and 1-octene. The modified Ziegler-Natta catalyst and/or the molecular catalyst may be used to polymerize ethylene to give a polyethylene. Alternatively, the modified Ziegler-Natta catalyst and/or the molecular catalyst may be used to polymerize a $(C_3-C_{40})$ alpha-olefin to give a poly$((C_3-C_{40})$alpha-olefin) polymer. Alternatively, the modified Ziegler-Natta catalyst and/or the molecular catalyst may be used to copolymerize ethylene and at least one $(C_3-C_{40})$alpha-olefin to give a poly(ethylene-co-$(C_3-C_{40})$alpha-olefin) copolymer. Polymerizations may be done in any suitable rector such as a batch reactor or in a continuous reactor such as a continuous solution polymerization reactor.

Method of polymerizing an olefin. In the polymerization method, the modified Ziegler-Natta procatalyst may be used as one would use a standard Ziegler-Natta procatalyst to catalyze, upon activation with an activator, polymerization of at least one (e.g., 1, 2, or more) polymerizable olefins. The molecular (pro)catalyst may be used to modify a standard Ziegler-Natta procatalyst to prepare the modified Ziegler-Natta procatalyst. The molecular (pro)catalyst may also be used as one would use a standard molecular (pro)catalyst to catalyze, upon activation with an activator, polymerization of at least one (e.g., 1, 2, or more) polymerizable olefins. The modified Ziegler-Natta procatalyst and molecular procatalyst, once activated, independently may catalyze polymerization of the same or different polymerizable olefins. The method may be a slurry polymerization process conducted at a temperature from 0° to 100° C. Alternatively, the method may be a gas phase polymerization process conducted at a temperature from 30° to 120° C. Alternatively, and typically, the method may be a solution phase polymerization process conducted at a temperature from 100° to 250° C. The pressure may be 150 psi to 3,000 psi (1 megapascal (MPa) to 21 MPa).

The method of polymerizing an olefin may be carried out in a reaction mixture containing at least one polymerizable olefin and the modified Ziegler-Natta catalyst, which is prepared by contacting the modified Ziegler-Natta procatalyst with one or more activators (e.g., with (A), alternatively with (G), alternatively with (A) and (G), alternatively with (G) followed by (A). The reaction mixture may contain an additional amount of (C) saturated or aromatic hydrocarbon liquid as a diluent or solvent so as to avoid oversaturating the (C) with polymer product, and thereby reducing catalyst efficiency. In some aspects the amount of polymer product in the reaction mixture is less than or equal to 30 wt %. The reaction mixture may be agitated (e.g., stirred) and the temperature of the reaction mixture may be controlled by removing heat of reaction therefrom so as to optimize the polymerization. In the method of polymerizing an olefin the modified Ziegler-Natta catalyst is used in a catalytically effective amount, such as from 0.0001 to 0.1 milligram-atoms of Ti per liter (L) of the reaction mixture. The method of polymerizing an olefin may be a batch method, semi-continuous method, or a continuous method. The continuous method continuously supplies reactants to the reactor and removes polymer product from the reactor. The semi-continuous method periodically adds reactants to the reactor and periodically removes polymer product from the reactor. The batch method adds reactants to the reactor and then removes polymer product from the reactor after the reaction is finished.

An example of a method of polymerizing uses a stirred-tank reactor, into which the polymerizable olefin(s) are introduced continuously together with any additional amount of (C) (C) saturated or aromatic hydrocarbon liquid. The reactor contains a liquid phase composed substantially of ethylene, and optionally a $(C_3-C_{40})$alpha-olefin, (C) and dissolved polymer product. The catalysts and/or their procatalysts and activators are continuously or intermittently introduced into the reactor liquid phase, or any recycled portion thereof. The reactor temperature and pressure may be controlled by adjusting the solvent/olefin ratio, the catalyst addition rate, as well as by cooling or heating coils, jackets or both. The extent of the reaction may be controlled by the rate of catalyst(s) addition. The ethylene content of the polymer product is determined by the ratio of ethylene to $(C_3-C_{40})$alpha-olefin, if any, in the reactor, which is controlled by manipulating the respective feed rates of these components to the reactor. The polymer product's molecular weight is controlled, optionally, by controlling other polymerization variables such as the temperature, olefin concentration(s), or by feeding molecular hydrogen at a controlled rate into the reactor. If used, the molecular hydrogen may have a concentration of 0.001 to 1 mole percent per 1 mole of ethylene. Upon exiting the reactor, the effluent containing product polymer (product polyolefin composition) may be contacted with a catalyst kill agent such as water, steam or an alcohol. The product polymer mixture is optionally heated, and the polymer product recovered by flashing off gaseous or vaporous components such as ethylene, alpha olefin, and component (C), optionally under reduced pressure. If desired, further devolatilization may be done in a devolatilizing extruder. In the continuous process the mean residence time of the catalyst and product polymer in the reactor generally is 1 minute to 8 hours, and alternatively 5 minutes to 6 hours. Alternatively, a continuous loop reactor such as in U.S. Pat. Nos. 5,977,251; 6,319,989; or 6,683,149 and ad rem conditions may be used instead of the stirred tank reactor.

In some aspects the method of polymerizing an olefin is a solution phase process.

Polyolefin product made by the method of polymerizing an olefin. The product comprises a polyolefin composition comprising polyolefin macromolecules. The polyolefin product may be a polymer or copolymer. The polymer may be a homopolymer such as polyethylene, a poly(($C_3-C_{40}$) alpha-olefin) polymer such as polypropylene. The copolymer may be a poly(ethylene-co-$(C_3-C_{40})$alpha-olefin) copolymer such as a poly(ethylene-co-propene) copolymer, a poly(ethylene-co-1-butene) copolymer, a poly(ethylene-co-1-hexene) copolymer, or a poly(ethylene-co-1-octene) copolymer. The polyethylene may be a high density polyethylene (HDPE), linear low density polyethylene (LLDPE), medium density polyethylene (MDPE), high melt strength high density polyethylene (HMS-HDPE), or a combination of any two or more thereof.

The polyolefin polymer or copolymer may further include one or more additives such as antistatic agents, color enhancers, dyes, lubricants, fillers, pigments, primary antioxidants, secondary antioxidants, processing aids, and ultraviolet (UV) light stabilizers. The resulting additive containing polyolefin (co)polymer may comprise from 0 wt % to 10 wt % of each additive, based on the weight of the additive containing polyolefin (co)polymer. Antioxidants, such as Irgafos™ 168 and Irganox™ 1010, may be used to protect the polyolefin (co)polymer from thermal and/or oxidative degradation. Irganox™ 1010 is tetrakis (methylene (3,5-di-tert-butyl-4hydroxyhydrocinnamate) available from Ciba Geigy Inc. Irgafos™ 168 is tris (2,4 di-tert-butylphenyl) phosphite available from Ciba Geigy Inc.

The polyolefin product made by the method may comprise a first polymer and a second polymer, which is different than the first polymer. The first polymer may be primarily produced by a first reaction catalyzed by the Ziegler-Natta catalyst, which is prepared by contacting the initial Ziegler-Natta procatalyst with at least one activator (e.g., (A) or both (G) and (A)). The second polymer may be primarily produced by a second reaction catalyzed by the molecular catalyst, which is prepared by contacting the molecular ligand-metal complex (pro)catalyst with at least one activator (e.g., (A) or (I)). The ratio of first polymer to second polymer in the polyolefin product may be controlled by controlling the selection and relative amount of the initial Ziegler-Natta procatalyst to the molecular (pro)catalyst, or by controlling the selection and amount of activator used to prepare the initial Ziegler-Natta catalyst and controlling the selection and amount of the activator used to prepare the molecular catalyst.

The polymer product may have a weight average molecular weight (Mw) from 50,000 to 300,000 grams/mole (g/mol). The polymer product may have a polymer density from 0.880 to 0.970 g/cc, alternatively 0.890 to 0.960 g/cc (gram per cubic centimeter).

The polyolefin product may be used in a forming operation to prepare manufactured articles from or comprising the polyolefin product. Examples of such forming operations are film forming, sheet forming, pipe forming, fiber extruding, fiber co-extruding, blow molding, injection molding, and rotary molding. The manufactured articles prepared thereby may be blown or cast films, such as films formed by co-extrusion or lamination; fibers such as melt spun fibers and melt blown fibers for use in non-woven and woven fabrics; extruded articles; and molded articles. The films may be made as shrink films, cling films, stretch films, sealing films, oriented films, snack packaging films, heavy duty bags, grocery sacks, baked and frozen food packaging, medical packaging, industrial liners, agricultural films, and membranes such as food-contact and non-food-contact membranes. The fibers may be made for use in diaper fabrics, medical garments, and geotextiles. The extruded articles may be made as medical tubing, wire and cable coatings, geomembranes, and pond liners. The molded articles may be made as bottles, tanks, large hollow articles, rigid food containers, and toys.

The aspects herein have numerous advantages. One of the advantages is that the modified catalyst system may produce a polyolefin composition that is different than a polyolefin composition obtained from using a Ziegler-Natta catalyst alone.

Another advantage is the modified catalyst system in one part in a single reactor in a solution phase polymerization process, eliminating the need for separate catalyst feeds, separate reactors, and specialized equipment relating thereto.

Another advantage is that the polyolefin composition produced by the modified catalyst system may have at least one of the following improved properties: polymer density, polymer molecular weight, comonomer distribution, and short chain branching distribution.

"Activator" (sometimes referred to as a co-catalyst) means a compound that is effective for reacting with a procatalyst to give a catalyst, which is catalytically active. Examples of activators are the (A) hydrocarbylaluminoxane, (G) organoborate, (H) organoboron, (I) trialkylaluminum, and a combination of any two or more thereof. E.g., a combination of (A) and (G), alternatively (A) and (H), alternatively (A) and (I), alternatively (G) and (I). In some aspects the combination of (G) and (A) is used. In some aspects (G) is used first, followed by (A); alternatively (A) followed by (G).

The phrase "early transition metal" means an element of any one of Groups 3 to 5. The phrase "late transition metal" means an element of any one of Groups 8 to 11.

As used here "procatalyst" (also may be referred to as a precatalyst) means a material that may exhibits no or low polymerization activity (e.g., catalyst efficiency may be 0 or <1,000) in the absence of an activator (e.g., (A), (G), (H), and/or (I)), but upon activation with an activator (e.g., (A), (G), (H), and/or (I)) yields a catalyst that shows at least 10 times greater catalyst efficiency than that of the procatalyst.

In some aspects the (D) solid particulate consisting essentially of magnesium halide, and the suspension of (D) in the (C) saturated or aromatic hydrocarbon liquid, and the (B) magnesium halide-supported titanium procatalyst prepared from the (D) solid particulate consisting essentially of magnesium halide, and the suspension of the (B) magnesium halide-supported titanium procatalyst in the compound (C) saturated or aromatic hydrocarbon liquid, and the enhanced catalyst prepared from the suspension of the (B) magnesium halide-supported titanium procatalyst in the compound (C) saturated or aromatic hydrocarbon liquid and the (A) hydrocarbylaluminoxane, collectively "inventive materials", are purer than their counterpart standard materials. The greater purity of the inventive materials is due in part by virtue of how they are respectively prepared, as described earlier, e.g., having a lower active halide impurity content. For example, the respective present methods of preparing the inventive materials (B) and enhanced catalyst avoid using alkylaluminum compounds and aluminum halide compounds, whereas at least some counterpart standard materials may have been prepared using alkylaluminum compounds and aluminum halide compounds, which generate undesired by-products. Also, the preparation of the enhanced catalyst using the (A) hydrocarbylaluminoxane with the inventive suspension of the (B) magnesium halide-supported titanium procatalyst in the compound (C) saturated or aromatic hydrocarbon liquid is an improvement over standard preparations aluminum halide compound. As used herein, the phrases "consisting essentially of" and "consists essentially of" are partially closed-ended phrases that capture the greater purities of the inventive materials and in this context may mean having 0 mol %, alternatively having >0 mol % to <5 mol %, alternatively >0 mol % to <3 mol %, alternatively >0 mol % to <2 mol % of a material other than the listed materials that follow the phrases, or reactants used to prepare those listed materials.

EXAMPLES

Brunauer, Emmett, Teller (BET) Surface Area Method: Measure surface area with a Tristar 3020 Surface Area Analyzer by Micromeritics. Filter 30 mL of a MgCl2 slurry, reslurry in 30 mL hexane, filter the reslurry under inert atmosphere, wash with additional hexane. Repeat the reslurrying, filtering, and washing steps to obtain a filtercake of MgCl2. Remove residual solvent from filtercake under a first vacuum. Further dry the filtercake on a Vac Prep 061 by Micromeritics using a 0.5 inch (1.27 cm) sample tube and a Transeal stopper designed for inert sample protection by loading a 0.2 g sample of the first vacuum-dried MgCl2 into the tube under inert atmosphere and stoppered with Transeal stopper. Connect tube to Vac Prep 061 unit, purging with nitrogen gas while connecting sample. Open Transeal stopper, place tube's contents under second vacuum, place evacuated tube in heating block with an aluminum tube protector. Dry under second vacuum on Vac Prep 061 at 110 C. for 3 hours, introduce nitrogen gas into tube, and allow sample to cool to room temperature before disconnecting tube from Vac Prep 061 to give fully dried sample. Under inert atmosphere, transfer 0.1500 to 0.2000 g of fully dried sample into a clean sample tube, place tube filler rod in tube, seal tube with Transeal stopper, connect to Tristar 3020, and measure surface area. Use QUICKSTART method to acquire the data.

Gel Permeation Chromatography (GPC) Method. Instrument: PolymerChar GPC-IR (Valencia, Spain) high temperature GPC chromatograph equipped with an internal IR5 detector, autosampler, and PolymerChar GPCOne™ software. Temperatures: autosampler oven compartment at 160° C. and column compartment at 150° C. Chromatographic solvent: Nitrogen-sparged 1,2,4 trichlorobenzene that contains 200 parts per million (ppm) of butylated hydroxytoluene (BHT). Injection volume: 200 microliters (µL). Flow rate 1.0 µL/minute. Columns: 3 Agilent "Mixed B" 30 centimeter (cm)×10-micrometer (µm) linear mixed-bed columns and a 10-µm pre-column. Prepare samples using the autosampler targeting 2 milligrams sample per milliliter solvent (mg/mL) in a septa-capped vial that has been nitrogen sparged, and shaking the vial at low speed for 2 hours at 160° C.

GPC Method continued: Calibrate columns with 21 narrow MWD polystyrene (PS) standards from Agilent Technologies and having molecular weights (MW) 580 to 8,400,000 g/mol and arranged in 6 "cocktail" mixtures with at least a decade separation between Mw. Prepare PS standards at 0.025 g in 50 milliliters (mL) of solvent for MW≥1,000,000 g/mol and 0.05 g/mL solvent for MW<1,000,000 g/mol. Convert PS standard peak MW to polyethylene MW as described in Willams and Ward, J. Polym. Sci., Polym. Lett., 1968; 6: 621, using Equation EQ1: $M_{polyethylene}=A \times (M_{polystyrene})^B$ EQ1, wherein M is molecular weight, A equals 0.4315, and B equals 1.0. Use fifth order polynomial t fit respective polyethylene-equivalent calibration points. Make a small adjustment to A (from about 0.415 to 0.44) to correct for column resolution and band-broadening effects such that MW for NIST standard NBS 1475 is obtained at 52,000 g/mol. Monitor deviations over time using a flow rate marker, e.g., decane, in each sample (introduced via micropump) to align flow rate marker peak from sample to flow rate marker peak of PS standards. Use flow rate marker to linearly correct flow rate for each sample by aligning respective sample flow rate marker peaks to respective PS standards flow rate marker peaks. Assume any changes in time of the flow rate marker peak are related to a linear shift in flow rate and chromatographic slope. For best accuracy of RV measurement of the flow rate marker peak, use a least-squares fitting routine to fit the flow rate marker peak of a flow rate marker concentration chromatogram to a quadratic equation. Use PolymerChar GPCOne™ software to process flow rate marker peak.

GPC Method continued: Measure total plate count (Equation EQ2) and symmetry (Equation EQ3) of GPC columns with 0.04 g eicosane dissolved in 50 mL of TCB. EQ2: Plate Count=$5.54*[(RV_{Peak\ Max})$ divided by (Peak Width at ½ height)]$^2$, wherein RV is retention volume (mL), peak width is in mL, peak max is maximum height of peak, and ½ height is half height of peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, : \quad EQ3$$

wherein RV and peak width are as defined above, peak max is the maximum position of the peak, one tenth height is $^1/_{10}$ height of the peak maximum, rear peak is the peak tail at later retention volumes than those of the peak max, and front peak refers to the peak front at earlier retention volumes than the peak max. Plate count should be >24,000 and symmetry should be >0.98 to <1.22.

GPC Method continued: Calculate number average molecular weight (Mn), weight average molecular weight (Mw), and z-average molecular weight (Mz) from GPC results from using internal IR5 detector (measurement channel) of the PolymerChar GPC-IR instrument and PolymerChar GPCOne™ software. Baseline-subtract the IR chromatogram at each equally-spaced data collection point (i), and obtain the polyethylene equivalent Mn, Mw, and Mz from the narrow standard calibration curve for the same point (i) from EQ1.

Crystallization Elution Fraction (CEF) Method is conducted according to Monrabal et al, Macromol. Symp. 257, 71-79 (2007). Equip a CEF instrument with an IR-4 or IR-5 detector (such as that sold commercially from PolymerChar, Spain) and a two-angle light scattering detector Model 2040 (such as those sold commercially from Precision Detectors). Install a 10 micron guard column of 50 mm×4.6 mm (such as that sold commercially from PolymerLabs) before the IR-4 or IR-5 detector in a detector oven. Use ortho-dichlorobenzene (ODCB, 99% anhydrous grade) and 2,5-di-tert-butyl-4-methylphenol (BHT) (such as commercially available from Sigma-Aldrich) and silica gel 40 (particle size 0.2~0.5 mm) (such as commercially available from EMD Chemicals). Dry the silica gel in a vacuum oven at 160° C. for at least two hours before use. Sparge the ODCB with dried nitrogen ($N_2$) gas for one hour before use. Further dry the ODCB by adding five grams of the dried silica to two liters of ODCB or by pumping the ODCB through a column or columns packed with dried silica at a flow rate between 0.1 mL/min. to 1.0 mL/min. Add 800 milligrams (mg) of BHT to two liters of ODCB if no inert gas such as $N_2$ is used in purging a sample vial. Dried ODCB, with or without BHT, is hereinafter referred to as "ODCB-m". Prepare a sample solution using the autosampler by dissolving a polymer sample in ODCB-m at 4 mg/mL with shaking at 160° C. for 2 hours. Inject 300 μL of the sample solution into the column. Use a temperature profile: crystallization at 3° C./min. from 110° to 30° C., thermal equilibrium at 30° C. for 5 minutes (including Soluble Fraction Elution Time being set as 2 minutes), and elution at 3° C./min. from 30° to 140° C. Use a flow rate during crystallization of 0.052 mL/min and a flow rate during elution of 0.50 mL/min. Collect 1 data point of IR-4 or IR-5 signal data/second.

CEF Method continued. Pack a column with glass beads at 125 μm±6% (such as those commercially available with acid wash from MO-SCI Specialty Products) with ⅛ inch stainless tubing according to U.S. Pat. No. 8,372,931. The internal liquid volume of the CEF column is between 2.1 mL and 2.3 mL. Perform temperature calibration using a mixture of NIST Standard Reference Material linear polyethylene 1475a (1.0 mg/mL) and Eicosane (2 mg/mL) in ODCB-m. The calibration consists of: (1) calculating the delay volume defined as the temperature offset between the measured peak elution temperature of Eicosane minus 30.00° C.; (2) subtracting the temperature offset of the elution temperature from the CEF raw temperature data (the temperature offset is a function of experimental conditions, such as elution temperature, elution flow rate, etc.); (3) creating a linear calibration line transforming the elution temperature across a range of 30.00° to 140.00° C. such that NIST linear polyethylene 1475a has a peak temperature at 101.00° C. and Eicosane has a peak temperature of 30.00° C.; (4) for the soluble fraction measured isothermally at 30° C., linearly extrapolate the elution temperature using the elution heating rate of 3° C./min. Reported elution peak temperatures are obtained such that the observed comonomer content calibration curve agrees with those in U.S. Pat. No. 8,372,931.

The weight percentage of purge fraction (PF; Wt1), low density copolymer component (Wt2), high density copolymer component (Wt3), and high density fraction (HDF; Wt4) are defined as polymer peaks in the following 4 temperature ranges: 25° to 33° C., 33° to 68° C., 68° to 92° C., and 92° to 115° C., respectively. Weight average molecular weights of these four purge fractions are Mw1, Mw2, Mw3, and Mw4, respectively. The contribution of copolymer in the low density range of the overall polymer by the molecular catalyst was reflected in the increased value of Wt2/Wt3, the relative ratio of the amount of the low density copolymer to the higher density of copolymer in the overall polymer obtained. In some aspects the ratio Wt2/Wt3 is from 0.18 to 0.9, alternatively 0.19 to 0.81.

Catalyst efficiency ("Cat. Eff."): calculate Cat. Eff. based on the amount of ethylene consumed during polymerization per gram of Ti in the magnesium halide-supported titanium catalyst (g ethylene/g Ti).

Batch reactor. A stirred 1-gallon reactor having a bottom valve.

Batch Reactor Copolymerization Test Method. Charge batch reactor with 250 g of 1-octene and 1330 g of Isopar E. Heat reactor contents to 190° C., then saturate contents with ethylene in presence of 40 millimoles (mmol) of $H_2$. Mix suspension of catalyst (e.g., (B1) or (B2)) in liquid (e.g., (C1)) and activator (e.g., (A1)) in separate flask, and immediately add resulting mixture into the batch reactor. Maintain pressure in the reactor at 3100 kilopascals (kPa; equal to 450 pounds per square inch (psi)) with ethylene flow to compensate for pressure drop due to ethylene consumption during polymerization thereof. After 10 minutes reaction time, open bottom valve and transfer reactor contents into a glass kettle. Pour contents of kettle onto a Mylar lined tray, allow contents to cool, and place tray in fume hood overnight to evaporate most of the liquid. Dry remaining resin in a vacuum oven to give a product poly(ethylene-co-1-octene) copolymer.

Hydrocarbylaluminoxane (A1). Modified methylaluminoxane, type 3A (MMAO-3A) having an approximate molecular formula [(CH$_3$)$_{0.7}$(isoC$_4$H$_9$)$_{0.3}$AlO. CAS No. 146905-79-5. Obtained as a solution in heptane from AkzoNobel N.V.

Compound (C1). Isopar E fluid. >99.75% to 99.9% of naphtha (petroleum), light alkylate, CAS 64741-66-8, and 0.1 to <0.25% isooctane CAS 540-54-1, (isoalkanes mixture) obtained from Exxon Mobil Corporation. Having boiling range 114° to 139° C.

Particulate MgCl$_2$ (D1). Solid particulate MgCl$_2$ having a BET surface area of 375 to 425 m$^2$/g. Product prepared by diluting a 20 wt % solution of (F1), described below, in heptane into a measured quantity of (C1) to give a diluted solution; adding hydrogen chloride (HCl) slowly to the diluted solution with agitation at 30° C. until the molar ratio of Cl to Mg reaches 2.04:1.00 while maintaining the temperature at 30°±3° C., to give a 0.20 M suspension of (D1) in (C1).

Titanium tetrachloride (E1). TiCl$_4$ obtained from Sigma Aldrich Company

Dialkylmagnesium (F1). Butyl-ethyl-magnesium. Used as a 20 wt % solution in heptane.

Organoborate (G1). Methyldi((C$_{14}$-C$_{18}$)alkyl)ammonium salt of tetrakis(pentafluorophenyl)borate, prepared as described earlier. A mixture in a cycloalkane.

Trialkylaluminum (I1): triethylaluminum (TEA). (CH$_3$CH$_2$)$_3$Al solution in heptane.

Molecular Ligand-Metal Complex Procatalyst 1: bis((2-oxoyl-3-(3,5-bis-(1,1-dimethylethyl)phenyl)-5-(methyl)phenyl)-(5-2-methyl)propane-2-yl)2-phenoxy)-1,3-propanediyl zirconium (IV)dimethyl, as disclosed in WO 2007/136494. Used as a mixture in a cycloalkane.

For the following preparations, Ti loading, molar ratio of activator (e.g., TEA) or activator (e.g., (G1)) to titanium ("activator/Ti"), process conditions and data are listed later Table 1.

Preparation 1 (P1): Magnesium chloride-supported titanium procatalyst (B1). Add 0.80 milliliter (mL) of a 0.25 Molar (M) solution of (E1) in (C1) to 40 mL of a 0.20 M suspension of (D1) in (C1), and stir the resulting mixture overnight to give (B1) suspended in (C1).

Preparation 2 (P2): Magnesium chloride-supported titanium procatalyst (B2). Add 2.40 mL of a 0.25 M solution of (E1) in (C1) to 40 mL of a 0.20 M suspension of (D1) in (C1), and stir the resulting mixture overnight to give (B2) suspended in (C1).

Preparation 3A (P3A): enhanced Ziegler-Natta catalyst. Add 0.40 mL of a 0.125 M solution of (A1) MMAO-3A in heptane to a suspension of P1 to give enhanced Ziegler-Natta catalyst of P3 suspended in (C1).

Preparation 3B (P3B): enhanced Ziegler-Natta catalyst. Add 0.24 mL of a 0.125 M solution of (A1) MMAO-3A in heptane and 0.24 mL of a 0.003 M solution of (G1) in methylcyclohexane to a suspension of P1 to give enhanced Ziegler-Natta catalyst of P3B suspended in (C1).

Preparation 3C (P3C): enhanced Ziegler-Natta catalyst. Add 0.50 mL of a 0.125 M solution of (A1) MMAO-3A in heptane to a suspension of P1 to give enhanced Ziegler-Natta catalyst of P3 suspended in (C1).

Preparation 3D (P3D): enhanced Ziegler-Natta catalyst. Add 0.98 mL of a 0.125 M solution of (A1) MMAO-3A in heptane to a suspension of P1 to give enhanced Ziegler-Natta catalyst of P3 suspended in (C1).

Preparation 4A (P4A): enhanced Ziegler-Natta catalyst. Add 0.57 mL of a 0.125 M solution of (A1) MMAO-3A in heptane to a suspension of P2 to give enhanced Ziegler-Natta catalyst of P4A suspended in (C1).

Preparation 4B (P4B) (prophetic): enhanced Ziegler-Natta catalyst. Replicate the procedure of P3B except use a suspension of P2 instead of the suspension of P1 to give enhanced Ziegler-Natta catalyst of P4B suspended in (C1).

Preparation 4C (P4C): enhanced Ziegler-Natta catalyst. Add 1.42 mL of a 0.125 M solution of (A1) MMAO-3A in heptane to a suspension of P2 to give enhanced Ziegler-Natta catalyst of P4C suspended in (C1).

Preparation 4D (P4D): enhanced Ziegler-Natta catalyst. Add 0.20 mL of a 1.77 M solution of (A1) MMAO-3A in heptane to a suspension of P2 to give enhanced Ziegler-Natta catalyst of P4D suspended in (C1).

Preparation 5 (P5): magnesium halide-supported titanium procatalyst. Added 2.40 mL of a 1.0 M solution of EADC in (C1) to 40 mL of a stirred suspension of 0.20 M MgCl$_2$ (D1) in (C1). Stirred resulting mixture overnight at room temperature. Added 2.40 mL of a 0.25 M solution of titanium tetraisopropoxide in (C1). Stirred resulting mixture overnight to give the magnesium halide-supported titanium procatalyst of P5 suspended in (C1).

Preparation 6 (P6). Diluted suspension of procatalyst P5 to a concentration of 0.0050 M to give suspension of magnesium halide-supported titanium procatalyst of P6 in (C1).

Preparation 7 (P7): Prepared a 0.0050 M solution of Molecular Ligand-Metal Complex Procatalyst 1 in (C1).

Preparation 8 (P8). Molecular Ligand-Metal Catalyst 1 in (C1). Added a solution of (G1) in methylcyclohexane to the solution of procatalyst P7 in a relative amount such that the molar ratio of (G1) to Zr metal of Molecular Ligand-Metal Complex Procatalyst 1 was 2.4. Stirred for 5 minutes to give Molecular Ligand-Metal Catalyst 1 in (C1) of P8.

Inventive Example A (IEA): Modified Ziegler-Natta Procatalyst 1 (MZN1): Added suspension of procatalyst P6 in (C1) to Molecular Ligand-Metal Catalyst 1 of P8 in (C1) to give Modified Ziegler-Natta Procatalyst 1 in (C1).

Inventive Example B (IEB): Modified Ziegler-Natta Procatalyst 2 (MZN2): Added suspension of procatalyst P5 in (C1) to solution of Procatalyst 1 of P7 to give Modified Ziegler-Natta Procatalyst 2 in (C1).

Inventive Example A1 (IEA1): preparation of Modified catalyst system 1 (MCS1). Added activator (I1) to Modified Ziegler-Natta Procatalyst 1 of IEA to give Modified catalyst system 1 of IEA1 in (C1).

Inventive Example A2 (IEA2): preparation of Modified catalyst system 2 (MCS2). Added activator (A1) to Modified Ziegler-Natta Procatalyst 1 of IEA in (C1) to give Modified catalyst system 2 of IEA2 in (C1).

Inventive Example A3 (IEA3): preparation of Modified catalyst system 3 (MCS3). Added activator (I1) (2 times as much as added in IEA1) to Modified Ziegler-Natta Procatalyst 1 of IEA to give Modified catalyst system 3 of IEA3 in (C1).

Inventive Example A4 (IEA4): preparation of Modified catalyst system 4 (MCS4). Added activator (A1) (2 times as much as added in IEA2) to Modified Ziegler-Natta Procatalyst 1 of IEA to give Modified catalyst system 4 of IEA4 in (C1).

Inventive Example B1 (IEB1): preparation of Modified catalyst system 5 (MCS5). Added activators (I1) and (G1) to Modified Ziegler-Natta Procatalyst 2 of IEB to give Modified catalyst system 5 of IEB1 in (C1).

Inventive Example B2 (IEB2): preparation of Modified catalyst system 6 (MCS6). Added activators (A1) and (G1) to Modified Ziegler-Natta Procatalyst 2 of IEB to give Modified catalyst system 6 of IEB2 in (C1).

Inventive Example B3 (IEB3): preparation of Modified catalyst system 7 (MCS7). Added activators (I1) (2 times as much as added in IEB1) and (G1) to Modified Ziegler-Natta Procatalyst 2 of IEB to give Modified catalyst system 7 of IEB3 in (C1).

Inventive Example B4 (IEB4): preparation of Modified catalyst system 8 (MCS8). Added activators (A1) (2 times as much as added in IEB2) and (G1) to Modified Ziegler-Natta Procatalyst 2 of IEB to give Modified catalyst system 8 of IEB4 in (C1).

Comparative Example 1 (CE1): Added activator (I1) to Procatalyst P6 to give a comparative Ziegler-Natta catalyst.

Comparative Example 2 (CE2): Added activators (G1) and (A1) to Procatalyst P6 to give a comparative Ziegler-Natta catalyst.

Comparative Example 3 (CE3): Added activators (I1) and (G1) to Procatalyst P7 to give a comparative Ziegler-Natta catalyst.

Comparative Example 4 (CE4): Added activators (G1) and (A1) to Procatalyst P7 to give a comparative Ziegler-Natta catalyst.

Inventive Examples Polymerizations with different modified catalyst systems of IEA1 to IEA4 and IEB1 to IEB4 and different unmodified catalysts of CE1 to CE4. In separate runs, replicate the Batch Reactor Copolymerization Test Method as follows. Charge batch reactor with 250 g of 1-octene and 1330 g of Isopar E. Heat reactor contents to 190° C., then saturate contents with ethylene in presence of 40 millimoles (mmol) of molecular hydrogen. For different runs add different ones of Modified catalyst systems 1 to 8 (MCS1 to MCS8) of IEA1 to IEA4 and IEB1 to IEB4 and catalysts CE1 to CE4, respectively, into the batch reactor. Maintain pressure in the reactor at 3100 kPa with ethylene flow to compensate for pressure drop due to ethylene consumption during polymerization thereof. After 10 minutes reaction time, open bottom valve and transfer reactor contents into a glass kettle. Pour contents of kettle onto a Mylar lined tray, allow contents to cool, and place tray in fume hood overnight to evaporate most of the liquid. Dry remaining resin in a vacuum oven to give a product poly (ethylene-co-1-octene) copolymer from polymerizations with IEA1 to IEA4, IEB1 to IEB4 and CE1 to CE4, respectively.

Modified catalyst system compositions and polymerization characterization data are reported below in Table 1 and later in Table 2, respectively.

The modified catalyst systems 1 to 8 of IEA1 to IEA4 and IEB1 to IEB4, respectively, and comparative procatalysts 1 to 4 of CE1 to CE4, respectively, that were used in the solution phase polymerization processes had efficiencies and produced polyolefins having CEF composition analysis results shown below in Table 2. The contribution of copolymer in the low density range of the overall polymer by the molecular catalyst was reflected in the increased value of Wt2/Wt3, the relative ratio of the amount of the low density copolymer to the higher density of copolymer in the overall polymer obtained.

TABLE 2

Catalyst Performance and Polyolefin Characterization Data.

| Cat. Ex. No. | Cat. Eff. | Wt2/Wt3 |
|---|---|---|
| IEA1 | 154300 | 0.19 |
| IEA2 | 149400 | 0.38 |
| IEA3 | 128500 | 0.46 |
| IEA4 | 110700 | 0.79 |
| IEB1 | 171700 | 0.24 |
| IEB2 | 163000 | 0.80 |
| IEB3 | 167400 | 0.81 |
| IEB4 | 133800 | 1.55 |
| CE1 | 371900 | 0.14 |
| CE2 | 382800 | 0.15 |
| CE3 | 178000 | 8.01 |
| CE4 | 180200 | 7.95 |

As shown in Table 2, the modified Ziegler-Natta procatalyst, made by modifying an initial Ziegler-Natta procatalyst and a molecular (pro)catalyst and an organoborate activator (G1), used to prepare the modified catalyst systems 1 and 3 of IEA1 and IEA3, respectively, was successfully activated in the preparations with a trialkylaluminum, and the resulting modified catalyst systems 1 and 3 were used successfully, as if a single catalyst component, in a polymerization reaction that produced a polyolefin composition of polyolefin macromolecules of two distinct types: first polyolefins made by Ziegler-Natta catalysts and second polyolefins made by molecular catalysts. The modified Ziegler-Natta procatalyst was also used, as if a single procatalyst component, in a polymerization reaction with (A) hydrocarbylaluminoxane as activator that produced a mixture of polyolefin composition of the two distinct types of polyolefin macromolecules (e.g., made with modified catalyst systems IEA2

TABLE 1

Modified catalyst system Compositions.

| Ex. No. | MCS | Procatalyst loading Ti + Zr.+ G (μmol + μmol + μmol) | Molar ratio TEA/(Ti + Zr) | Molar ratio (G1)/(Ti + Zr) | Molar ratio (A1)/(Ti + Zr) |
|---|---|---|---|---|---|
| IEA1 | MCS1 | 3 + 3 + 7.2 | 5 | 0 | 0 |
| IEA2 | MCS2 | 3 + 3 + 7.2 | 0 | 0 | 25 |
| IEA3 | MCS3 | 3 + 3 + 7.2 | 10 | 0 | 0 |
| IEA4 | MCS4 | 3 + 3 + 7.2 | 0 | 0 | 50 |
| IEB1 | MCS5 | 3 + 3 + 0 | 5 | 0.6 | 0 |
| IEB2 | MCS6 | 3 + 3 + 0 | 0 | 0.6 | 25 |
| IEB3 | MCS7 | 3 + 3 + 0 | 10 | 1.2 | 0 |
| IEB4 | MCS8 | 3 + 3 + 0 | 0 | 1.2 | 50 |
| CE1 | P6 | 3 + 0 + 0 | 10 | 0 | 0 |
| CE2 | P6 | 3 + 0 + 0 | 0 | 1.2 | 50 |
| CE3 | P7 | 0 + 2 + 0 | 10 | 1.2 | 0 |
| CE4 | P7 | 0 + 2 + 0 | 0 | 1.2 | 50 | and IEA4). Another modified Ziegler-Natta procatalyst, made by modifying an initial Ziegler-Natta procatalyst and a molecular (pro)catalyst, used to prepare the modified catalyst systems 6 and 8 of IEB2 and IEB4, was successfully activated in the preparations with a combination of (A1) and (G1) activators that also produced a mixture of polyolefins of the two distinct types of macromolecules. The same modified Ziegler-Natta procatalyst was also used, as if a single procatalyst component, in a polymerization reaction with a combination of (I1) and (G1) activators as activator that produced a mixture of polyolefin composition of the two distinct types of polyolefin macromolecules (e.g., made with modified catalyst systems IEB5 and IEB7). Comparison of IEA1 and IEA3 or IEA2 and IEA4 indicated that higher amount of activator, e.g., (A1) or (I1), increased the amount of polyolefins made with the molecular catalyst in the product polyolefin composition. Similarly, an increase of the amount of polyolefin macromolecules made with the molecular catalyst in the product polyolefin composition was also achieved by increasing the amount of activators, e.g., (I1) and (G1) for IEB1 versus IEB3, and activators (A1) and (G1) for IEB2 and IEB4. The foregoing benefits may characterize embodiments of the inventive method and polyolefins described earlier and claimed below.

The invention claimed is:

1. A modified Ziegler-Natta procatalyst that is prepared by mixing an initial Ziegler-Natta procatalyst and a molecular (pro)catalyst together in (C) a saturated or aromatic hydrocarbon liquid under modifying conditions comprising a modifying temperature less than 100° C. and a modifying time of at least 1 minute, and optionally an activator, to give the modified Ziegler-Natta procatalyst; wherein the modified Ziegler-Natta procatalyst is free of a trialkylaluminum; and wherein the activator is selected from the group consisting of: (i) a (A) hydrocarbylaluminoxane; (ii) an organoborate or an organoboron; and (iii) both (i) and (ii); wherein the molecular (pro)catalyst is a molecular ligand-transition metal complex (pro)catalyst in which the transition metal is Ti, Zr, Hf, V, or Cr.

2. The modified Ziegler-Natta procatalyst of claim 1 wherein the activator is present and is selected from the group consisting of: (i) the (A) hydrocarbylaluminoxane or (iii) both (i) the (A) hydrocarbylaluminoxane and (ii) the organoborate or organoboron.

3. The modified Ziegler-Natta procatalyst of claim 1: (i) wherein the initial Ziegler-Natta procatalyst is (B) a magnesium halide-supported titanium procatalyst; wherein the (B) magnesium halide-supported titanium procatalyst has been prepared by contacting (D) a solid particulate consisting essentially of magnesium halide with (E) titanium tetrachloride in the (C) saturated or aromatic hydrocarbon liquid so as to give the (B) magnesium halide-supported titanium procatalyst; (ii) wherein the transition metal is Zr in the molecular ligand-metal complex (pro)catalyst; or (iii) both (i) and (ii).

4. The modified Ziegler-Natta procatalyst of claim 1 wherein the modifying conditions comprise: (i) a modifying temperature from 0° C. to 50° C.; (ii) a modifying time from 3 hours to 3 months; (iii) an inert gas atmosphere; (iv) both (i) and (ii); (v) both (i) and (iii); (vi) both (ii) and (iii); or (vii) each of (i), (ii), and (iii).

5. The modified Ziegler-Natta procatalyst of claim 3 wherein: (i) the magnesium halide-supported titanium procatalyst is free of Al (molar ratio of Al/Mg=0); (ii) the magnesium halide-supported titanium procatalyst has a molar ratio of Al/Mg from >0 to <0.05; (iii) the magnesium halide of the initial magnesium halide-supported titanium procatalyst is magnesium chloride; (iv) the magnesium halide of the initial magnesium halide-supported titanium procatalyst is magnesium bromide; (v) both (i) and (iii);
(vi) both (i) and (iv); (vii) both (ii) and (iii); or (viii) both (ii) and (iv).

6. The modified Ziegler-Natta procatalyst of claim 3 wherein: (i) the (D) solid particulate consisting essentially of magnesium halide has a Brunauer, Emmett, Teller (BET) surface area of ≥200 square meters per gram ($m^2/g$) as measured by Brunauer, Emmett, Teller (BET) Surface Area Method; or (ii) the (D) solid particulate consisting essentially of magnesium halide has been prepared by contacting a solution of (F) a dialkylmagnesium compound dissolved in the (C) saturated or aromatic hydrocarbon liquid with 1.95 to 2.05 mole equivalents of hydrogen halide to give a suspension of the (D) solid particulate consisting essentially of magnesium halide in the (C) saturated or aromatic hydrocarbon liquid; or (iii) both (i) and (ii).

7. The modified Ziegler-Natta procatalyst of claim 1 wherein the activator used with the modified Ziegler-Natta procatalyst comprises the (A) hydrocarbylaluminoxane.

8. The modified Ziegler-Natta procatalyst of claim 1 wherein the molecular ligand-metal (pro)catalyst comprises: (i) a cyclopentadienyl ligand-metal complex (pro)catalyst; or (ii) a cyclopentadienyl-free ligand-metal complex (pro)catalyst.

9. A modified catalyst system comprising a product of a reaction of the modified Ziegler-Natta procatalyst of claim 1 with the activator.

10. The modified catalyst system of claim 9 wherein the activator is the organoborate or the organoboron.

* * * * *